United States Patent [19]

Panster et al.

[11] Patent Number: 4,851,492

[45] Date of Patent: Jul. 25, 1989

[54] ORGANOPOLYSILOXANES CONTAINING ACYL THIOUREA GROUPS, METHODS OF THEIR PREPARATION AND USE

[75] Inventors: Peter Panster, Rodenbach; Karl-Heinz Koenig, Frankfurt; Elske Schopenhauer-Gehrmann, Eschborn; Peter Kleinschmit, Hanau, all of Fed. Rep. of Germany

[73] Assignee: Degussa Aktiengesellschaft, Frankfurt, Fed. Rep. of Germany

[21] Appl. No.: 160,046

[22] Filed: Feb. 24, 1988

[30] Foreign Application Priority Data

Feb. 28, 1987 [DE] Fed. Rep. of Germany ....... 3706523

[51] Int. Cl.$^4$ ............ C08G 77/28; C08G 79/00; C08G 77/10
[52] U.S. Cl. ............................. 528/9; 528/26; 528/28; 528/30; 528/31; 528/38; 556/9; 556/10; 556/420; 556/421; 556/424; 556/427
[58] Field of Search ............... 528/30, 31, 38, 28, 528/26, 9; 556/420, 421, 424, 427, 9, 10

[56] References Cited

U.S. PATENT DOCUMENTS

| | | | |
|---|---|---|---|
| 3,269,982 | 8/1966 | Meals | 528/30 |
| 3,642,855 | 2/1972 | Berger | 528/30 |
| 4,424,332 | 1/1984 | Panster et al. | 528/30 |
| 4,448,694 | 5/1984 | Plueddemann | 210/682 |
| 4,455,415 | 6/1984 | Panster et al. | 528/39 |
| 4,645,848 | 2/1987 | Panster et al. | 556/9 |

FOREIGN PATENT DOCUMENTS 18102 10/1980 European Pat. Off. ............ 556/424

Primary Examiner—John C. Bleutge
Assistant Examiner—Ralph Dear, Jr.
Attorney, Agent, or Firm—Beveridge, DeGrandi & Weilacher

[57] ABSTRACT

Organopolysiloxane products containing acyl thiourea groups and from the units:

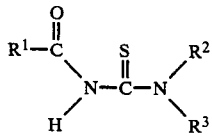

are disclosed. $R^1$ stands for an optionally substituted phenyl group or an alky group and $R^2$ and $R^3$ for

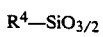

units. $R^4$ is alkylene. The free valences of the oxygen atoms are saturated by Si atoms of further $R^4-SiO_{3/2}$ groups and/or by Si atoms of:

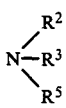

amine units, wherein $R^5=H$; $R^2$ or $R^3$ and/or by cross-linking compounds of Si, Ti or Al. The ratio between the Si atoms in (1) and (3) to the Si, Ti, Al cross-linking atoms is 1:0 to 1:10. Various methods of preparing the products are described. These polymers to separate metals from solutions.

8 Claims, No Drawings

ORGANOPOLYSILOXANES CONTAINING ACYL THIOUREA GROUPS, METHODS OF THEIR PREPARATION AND USE

INTRODUCTION AND BACKGROUND

The present invention relates to new organopolysiloxanes which contain acyl thiourea groups and which can be used to remove noble and base metals from diluted aqueous or organic solutions. In addition, the present invention relates to methods of preparing these new organopolysiloxanes.

The removal and separation of metals from aqueous or organic solutions, which are frequently present in very diluted form, constitutes a significant problem in many areas of industry. This is due in part to completely different points of view. One aspect can be, for example, the recovery of valuable noble metals from catalytic or developmental processes. Another viewpoint is the purification e.g. of solutions, of drinking water or for waste water for reasons of toxicology or of environmental protection.

The various reasons why the separation of metals from solutions is of interest can also be seen from the following literature cited by way of example:
DE-OS No. 33 47 406; DD Pat. Nos. 207 915; 212 190; 212 257; U.S. Pat. No. 4,448,694; DE-OS No. 25 22 812; DE Pat. Nos. 33 40 055; 33 40 056; EP-OS No. 0 030 106; U.S. Pat. No. 4,377,555; DE-OS No. 30 02 883 or U.S. Pat. No. 3,978,148.

Various methods are used to separate these metals from their solutions. It is frequently customary to use suitably modified organic polymers (e.g. DD Pat. Nos. 207 915; 212 190; 212 257 or U.S. Pat. No. 4,448,694) or to use liquid or dissolved complex-formation agents (cf. DE Pat. Nos. 33 40 055 and 33 40 056; DE-OS No. 33 47 406). However, these methods are not ideal. On the one hand, the organic polymer carriers used are frequently not equal to the requirements, due to their low temperature and solvent stability. On the other hand, the use of liquid or dissolved complexing agents requires a technical expense which can be considerable in some instances.

Basically, it would be more advantageous to use suitably functionalized inorganic carriers such as e.g. silica gel, which exhibit in particular a better temperature and solvent stability. Such systems have also already been prepared and employed (cf. GB No. 1,532,295); however, they have the disadvantage that these inorganic carriers can be functionalized only to a relatively limited extent.

It is therefore an object of the present invention to provide a method for the preparation of metal adsorbent systems based on a polymer framework of primarily inorganic character and to avoid at the same time the above-mentioned disadvantage of a too-low metal ion binding capacity.

It also appeared to be especially suitable to use an acyl thiourea group as complexing unit which has proven to be especially effective (cf. DE Pat. Nos. 33 40 055 and 33 40 056 or DD-PS No. 212 190).

SUMMARY OF THE INVENTION

In accordance with the present invention, there are provided new polymeric compounds which are organopolysiloxanes containing acyl thiourea groups. The novel polymers of this invention are characterized in that they comprise recurring units represented by formula (1)

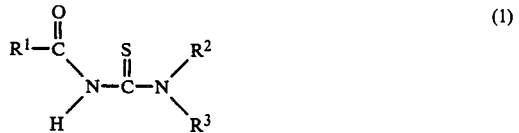

wherein:
$R^1$ represents a phenyl group optionally substituted with an $NO_2$ group or represents an alkyl group with 1 to 3 C atoms,
$R^2$ and $R^3$ represent a group of formula (2)

in which
$R^4$ represents an alkylene group with 1 to 10 C atoms or a cycloalkylene group with 5 to 8 C atoms, or, a group of the formulae:

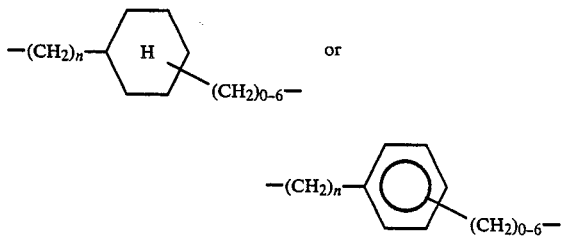

wherein n is a number from 1 to 6;
and the free valences of the oxygen atoms in formula (2) are saturated either by silicon atoms of additional groups of formula (2) and/or by silicon atoms of amine units according to formula (3):

in which $R^2$ and $R^3$ have the same meaning in accordance with formula (2) and can be the same or different,
$R^5$ represents H or has the same meaning as $R^2$ or $R^3$ and/or saturated by cross-linking bridging groups represented by:

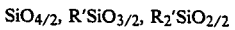

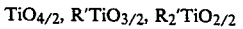

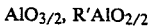

wherein R' represents a methyl or ethyl group and the ratio of the silicon atoms in formulae (1) and (3) to the bridging atoms silicon, titanium, aluminum can be 1:0 to 1:10.

$R^4$ can be a linear or branched chain alkylene group.

A preferred aspect of the invention resides in the new organopolysiloxanes containing acyl thiourea groups wherein $R^2$ and $R^3$ are identical to one another. This preferred group of polymers exhibit a particular stability and insensitivity to chemical attacks and are also distinguished by a very high resistance to solvents.

Particular advantages as regards the availability of the starting materials and the material properties of the resulting polymer products are achieved with organopolysiloxanes which contain acyl thiourea groups and in which formula (1) represents the units of the formula:

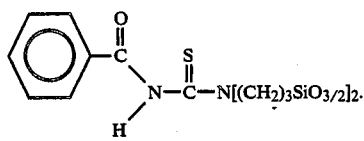

The fact that secondary amine units according to formula (3) are optionally present in the polymer unit results from the fact that secondary amino silanes or secondary amino siloxanes are employed as starting materials in the synthesis of the organopolysiloxanes containing acyl thiourea groups in accordance with the invention, or such compounds are present during the synthesis. As far as it is advantageous for the properties of the final product, only a partial reaction, as well as a complete reaction, of the secondary amine function into the acyl thiourea group can occur. This can be controlled via the reaction conditions. That is to say, control over the properties can be exerted via the presence of "free" secondary amine functions in the organopolysiloxane during use as adsorbent taking into consideration the type and amount of the bound metal ions.

An analogous situation also applies as regards the presence of tertiary amine functions. The latter are not required as initial components for the reaction, but they can be added separately into the polymer unit according to all of the preparation methods presented below for the compounds of the invention. In this respect, these tertiary amine groups are thus present along with the acyl thiourea groups and, optionally, also along with the secondary amino groups in the polymer unit. The molar ratio of the acyl thiourea groups present in the polymer unit according to formula (1) to the optionally present secondary and/or tertiary amino groups according to formula (3) can be from 1:0 to 1:9 in practice.

The inclusion of the previously mentioned, crosslinking briding groups containing Si, Ti and Al in the polymer unit serves to control the density of the acyl thiourea groups or to adjust certain specific surfaces or surface properties.

The present invention further relates to various methods of preparing the compounds of the invention. Two of these methods are characterized in that an organosiloxane amine is reacted with (I) an isothiocyanate, or, (II) an acyl chloride.

In particular, the organosiloxane amine described in German Pat. No. 31 20 214 and consisting of units of formula (3):

(3)

in which $R^2$ and $R^3$ represent units of formula (2), have the same meanings as in formula (2) and can be the same or different, $R^5$ is H, optionally in the presence of units of formula (3) in which $R^5$ can have the same significance as $R^2$ and $R^3$, is reacted with an isothiocyanate of formula (4)

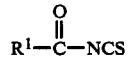
(4)

in which $R^1$ represents a phenyl group, optionally substituted with $NO_2$ groups or represents an alkyl group with 1 to 3 C atoms.

Alternatively, the organosiloxane amine of the German Pat. No. 31 20 214 is reacted with an acyl chloride of formula (5)

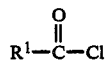
(5)

in which $R^1$ has the same significance as in formula (4), and in the presence of lithium rhodanide, sodium rhodanide, potassium rhodanide or ammonium rhodanide.

The reaction is carried out in the presence of an organic solvent at room temperature or above room temperature to a temperature of 200° C. at normal pressure or a superpressure which corresponds to the sum of the partial pressures at the particular temperature.

Following formation of the solid polymer product, the polysiloxane containing acyl thiourea groups is separated from the liquid phase, washed with a suitable solvent and then dried at a temperature of room temperature to 200° C., optionally in a vacuum or under an atmosphere of protective gas.

In carrying out the method, the polymeric amine of formula (3) can be used either in dry form as well as in a form moist with solvent. As will be apparent to those familiar with the art, in the reaction described above naturally only the secondary amine units according to formula (3) present in the polymeric solid react with the isothiocyanate according to formula (4) (method I) or with the acyl chloride of formula (5) and lithium rhodanide, sodium rhodanide, potassium rhodanide or ammonium rhodanide (method II), while the tertiary amine units of formula (3) still optionally present remain unchanged in the polymer.

These reactions can be further illustrated by the following equations (I) and (II):

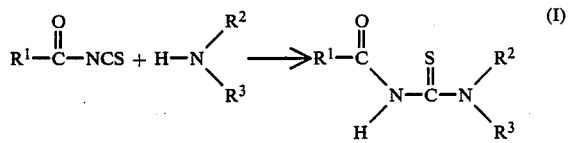
(I)

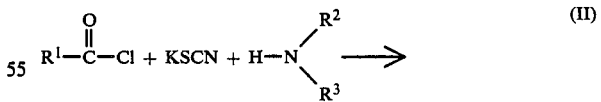
(II)

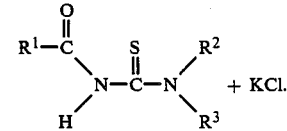

For the reaction according to equation (I) which illustrates the first method defined above, the following are especially suitable as solvents: lower alcohols with 1 to 5 C atoms, acetone, toluene, lower chlorinated hydrocarbons, openchain and cyclic ethers or esters such as e.g. acetoacetic ester, aliphatic or cycloaliphatic hydrocarbons with 5 to 8 C atoms.

In the case of a reaction according to equation (II) which illustrates the second of the two methods discussed above, care must be taken in the selection of the solvent that no secondary reaction with the acid chloride function occurs. Acetone or also tetrahydrofurane or dioxane, which must of course be largely water-free, are especially suitable in this instance.

The selection of the stoichiometry of the two reaction components in equation (I) depends on whether a complete reaction of the secondary amine functions present is intended to occur or only a partial reaction. In the first-named instance the use of at least stoichiometric amounts of acyl isothiocyanate in relation to the secondary amine units present in the polymer is necessary. However, as regards a greater reaction speed, it can also be advantageous to use excess amounts of the isothiocyanate component.

If a partial reaction of the secondary amine units present is desired, this can be controlled by the use of deficient amounts of acyl isothiocyanate or also via the duration of the reaction. This also basically applies to the reactions according to equation (II), whereby the molar ratio between the acyl chloride component and the rhodanide component is logically always 1:1.

In the case of reaction equation (I), only an insoluble product accumulates. Thus, a rewashing can be performed in principle with any of the solvents suitable for the reaction insofar as any washing is necessary, e.g. due to the low volatility of the acyl component used in excess. However, according to reaction equation (II), LiCl, NaCl, KCl or NH$_4$Cl also accumulate along with the insoluble product according to formula (1), so that in this instance a solvent which is different in relation to the reaction, e.g. even water, may have to be used for rewashing.

According to another method of the invention, the preparation of the new compounds according to formula (1) starts with monomeric alkoxysilanes which contain acyl thiourea groups and whose synthesis is described in the parallel application; Ser. No. 154,408 filed Feb. 10, 1988. This method is characterized in that a silane containing acyl thiourea groups and of the formula:

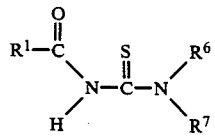

(6)

in which $R^1$ has the same meaning as in formula (1), $R^6$ and $R^7$ represent units of formula (7)

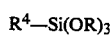 (7)

and can be the same or different, wherein $R^4$ has the same meaning as in formula (2), R represents a linear or branched chain alkyl group with 1 to 3 C atoms, is hydrolyzed and polycondensed with at least stoichiometric or excess amounts of water, optionally after the addition of a solvent, and optionally in the presence of a secondary and/or tertiary amino silane of formula (8):

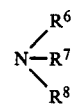 (8)

in which $R^6$ and $R^7$ have the same meaning as in formula (6) and can be the same or different, $R^8$ represents H or has the same meaning as $R^6$ or $R^7$, and/or optionally in the presence of a precursor of a cross-linking agent of the general formula:

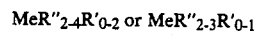

wherein
Me=Si, Ti or Al,
R" represents a linear or branched alkoxy group with 1 to 5 C atoms or chloride and
R' represents a methyl or ethyl group.

The solid product is separated, optionally after the addition of more solvent, from the liquid phase, optionally washed, dried optionally under an atmosphere of protective gas or with the use of a vacuum up to a temperature of 200° C., over a time period of 1 hour to several days, optionally ground and is classified.

The sequence of the individual steps in the work-up of the solid polycondensate polymer product can be varied as will be apparent to a person skilled in the art.

It can be advantageous, depending on the type of solvent used, to add a small amount of a polycondensation catalyst, e.g. a catalytic amount of a solution of HCl, NH$_3$ or NaOH, to the silane or silane mixture to be polycondensed. The precise amount of such catalyst will be readily determinable by persons skilled in this art.

Although the hydrolysis and polycondensation can basically also be performed without the use of a solvent, a solvent is to be preferred for practical reasons. The linear or branched chain alcohols with 1 to 3 C atoms corresponding to the R groups in formula (7) are well suited in particular as solvent for this further preparation method. However, other solvents which do not enter into a reaction with the silane can also be used, e.g. toluene, xylene, chlorinated hydrocarbons, nitromethane, nitrobenzene, acetone, methylethylketone, diethylketone, higher alcohols, dialkylether, aliphatic, linear, branched or cyclic hydrocarbons, dimethylsulfoxide, dimethylformamide.

When a cross-linking step is added, the miminum amount of water to be used, that is, the stoichiometric amount is to be adjusted in an appropriate manner. The hydrolysis and polycondensation can of course be performed not only at normal pressure but also at a reduced pressure or at superpressure.

The separation of the product from the liquid phase can be performed according to customary and well known techniques, either by distilling off the liquid or by filtering off or centrifuging out the solid.

The organopolysiloxanes containing acyl thiourea groups in accordance with the invention exhibit specific surfaces of less than 1 m$^2$/g to 1000 m$^2$/g as a function of the starting material, polycondensation medium used and polycondensation conditions. The particle sizes can be set within certain ranges by grinding; in general the size ranges between approximately 0.1 μm to 1 cm.

In accordance with a further object of the invention, the new organopolysiloxanes containing acyl thiourea groups can be used for removing dissolved metals from aqueous or organic solutions. The concentration of the metals in the aqueous or organic solutions can be in the range of several percent or also in the ppm or even ppb range. The metals to be separated include the valuable noble metals as well as heavy metals whose removal can contribute to the protection of the environment.

The organopolysiloxane polymers containing acyl thiourea groups can be used either in finely particulate form in an agitated suspension or in a somewhat more coarse-grained form in a fixed bed.

Temperatures from room temperature to 200° C. and pressures from normal pressure to a superpressure which corresponds to the sum of the partial pressures at the particular temperature can be used.

The products containing the metal sought to be recovered can be regenerated with thiourea.

DETAILED DESCRIPTION OF THE INVENTION

The invention is explained in more detail in the following examples in various embodiments.

EXAMPLE 1

149.6 g of a secondary polymeric amine consisting of units of the formula $HN[(CH_2)_3SiO_{3/2}]_2$ were suspended in 1.5 l dried acetone in a 6-liter three-neck flask with KPG agitator, internal thermometer and reflux condenser. The suspension was reacted at room temperature all at once with 143.0 g KSCN and 206.8 g benzoyl chloride and then heated within 1 hour to reflux temperature (60° C.). The suspension was agitated a total of 16 hours at reflux temperature, whereby the solid assumed an intense orange color and the liquid phase became more viscous. The suspension was filtered via a pressure filter and the solid matter remaining on the filter was first washed with acetone until the filtrate was colorless. Then, the solid was washed with a total of 5 l desalinated water. The product was then dried for 8 hours at 50° C. first and subsequently for 24 hours at 120° C. The weighed analytical product of the product was 251 g and an elementary analysis yielded the following values:

| % C | % H | % N | % S |
|---|---|---|---|
| 44.6 | 5.21 | 6.90 | 7.99 |

The following theoretical analytical data were to be expected:

| % C | % H | % N | % S |
|---|---|---|---|
| 45.88 | 4.95 | 7.64 | 8.74 | for the organopolysiloxane obtained containing benzoyl thiourea groups and consisting in the ideal case completely of units of the formula

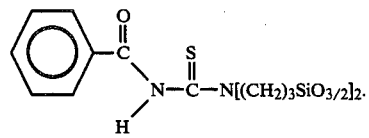

It can be seen from the S content of the polymer found and also from the other analytical values that a conversion of over 90% of the secondary amine units present into acyl thiourea groups occurred.

EXAMPLE 2

62.8 g of a polymeric organosiloxane amine consisting of 30 mole % of units of the formula $N[(CH_2)_3SiO_{3/2}]_3$ and of 70 mole % of units of the formula $HN[(CH_2)_3SiO_{3/2}]_2$ as well as 60.0 g KSCN were combined in 700 ml dry acetone. The suspension was transferred into a 2-liter flask with KPG agitator, reflux condenser and internal thermometer. After the addition of 86.8 g benzoyl chloride, the mixture was heated to reflux temperature and agitated 8 hours. Subsequently, the mixture was cooled off, 200 ml more of acetone were added and the solid filtered off via a pressure filter. After being washed with 1 l acetone and 1 l water, the orange-colored solid was dried 20 hours at 100° C./80 mbar. 88 g product were obtained with a sulfur content of 5.17%. This value indicates that approximately 80% of all secondary amine units originally present were converted into acyl thiourea groups of the formula:

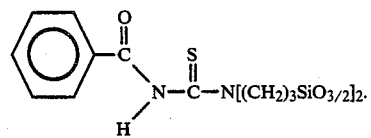

EXAMPLE 3

400 g of an organopolysiloxane amine consisting of 60 mole % of units of the formula $HN[(CH_2)_3SiO_{3/2}]_2$ and of 40 mole % of units of the formula $N[(CH_2)_3SiO_{3/2}]_3$ were suspended in 4 l acetone. The suspension was reacted with 410 g benzoyl isothiocyanate, heated to reflux temperature and agitated 12 hours under reflux. Then, the solid matter was filtered off and washed with 3 l acetone. After 8 hours of drying at 100° C./100 mbar, 509 g product with a sulfur content of 4.90% were obtained, which corresponds to a conversion of over 85% of the secondary amine units present.

EXAMPLE 4

Starting with 294.0 g of a polymeric organosiloxane amine consisting of units of the formula:

$HN[(CH_2)_3SiO_{3/2}]_2 \cdot SiO_2$ 108 g KSCN and 130 g benzoyl chloride, a polysiloxane (355.0 g) containing acyl thiourea groups and exhibiting the following analytic values was obtained in 2 l acetone after 15 hours reaction time analogously with Example 1:

| % C | % H | % N | % S | % Si |
|---|---|---|---|---|
| 37.95 | 4.65 | 5.35 | 3.30 | 21.15 |

The following theoretical analytical values should have been expected at a complete conversion of all secondary amine units present in the polymer:

| % C | % H | % N | % S | % Si |
| --- | --- | --- | --- | --- |
| 39.41 | 4.25 | 6.57 | 7.51 | 19.75 |

EXAMPLE 5

32.6 g of a polymeric organosiloxane amine consisting of 30 mole % of units of the formula $N[(CH_2)_{10}SiO_{3/2}]_3$ and of 70 mole % of units of the formula $HN[(CH_2)_{10}SiO_{3/2}]_2$ as well as 20.0 g KSCN were combined in 330 ml acetone. The suspension was transferred into a 1-liter flask with KPG agitator, reflux condenser and internal thermometer. After the addition of 29.0 g benzoyl chloride, the mixture was heated to reflux temperature and agitated 15 hours. After a further work-up in analogous manner as in Example 2, 39.6 g of product with a sulfur content of 3.32% were obtained.

EXAMPLE 6

30.0 g of a polymeric organosiloxane amine consisting of units of the formula:

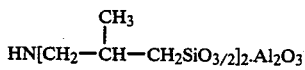

were reacted analogously to example 5 with 40 g

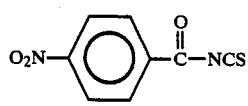

in 300 ml acetone within 10 hours. After a further recovery work-up of the product an analogous manner as in Example 2, 38.6 g of product with a sulfur content of 4.58% were obtained.

EXAMPLE 7

25 g of a polymeric organosiloxane amine consisting of units of the formula:

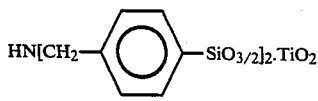

were reacted in analogous with Example 5 with 40 g benzoyl isothiocyanate within 16 hours in 300 ml i-propanol. After a further recovery work-up analogously with Example 3, 32.4 g polymeric product with a sulfur content of 5.6% and consisting primarily (over 80%) of units of the formula:

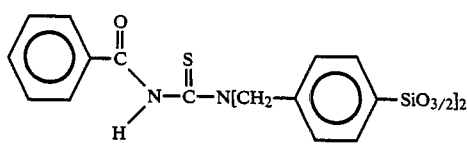

were obtained.

EXAMPLE 8

30 g of a polymeric organosiloxane amine consisting of units of the formula:

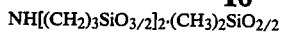

were reacted analogously with Example 1 with 21.0 g KSCN and 17.0 acetyl chloride in 300 ml acetone. After a further work-up analogously with Example 1, 37.6 g product consisting of over 85% of units of the formula:

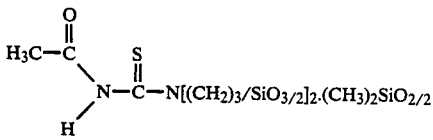

and with a sulfur content of 7.1% were obtained.

EXAMPLE 9

191.1 g of a polymeric secondary organosiloxane amine consisting of units of the formula $HN[(CH_2)_3SiO_{3/2}]_2$ were suspended in 1 l ethanol. The suspension was connected under agitation at room temperature within 15 min. with 306.7 g benzoyl isothiocyanate and subsequently agitated 5 hours under reflux. After having been washed with 2 l ethanol and dried 4 hours at 50° C. as well as dried 16 hours at 100° C. under an atmosphere of $N_2$, 298.1 g product with a sulfur content of 6.45% were obtained. This corresponds to a conversion of over 70% of the secondary amine units present into units of the formula:

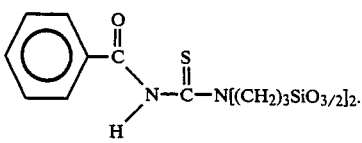

A determination of the specific surface of the product with an areameter yielded a value of 398 $m^2/g$.

EXAMPLE 10

100 g of a mixture consisting of 70 mole % of a silane containing acyl thiourea groups and represented by the formula:

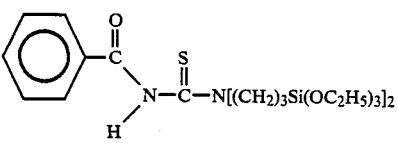

and of 20 mole % of a tertiary amino silane of the formula $N[(CH_2)_3Si(OC_2H_5)_3]_3$ were dissolved in 100 ml ethanol. The solution was transferred into a 1-liter three-neck flask with KPG agitator, reflux condenser and drop funnel and heated under agitation to 80° C. After having reached this temperature, 25 g desalinated water were added all at one time to the mixture. After a short time the mixture gelled completely and 300 ml more desalinated water were added. The solid matter formed thereby was agitated 1.5 hours more at reflux temperature, then cooled off, centrifuged out and washed twice with 250 ml ethanol per time. After drying 20 hours at 100° C. under an atmosphere of $N_2$, 55.4 g product with a sulfur content of 5.95% were obtained. Thus, the polymeric product obtained consisted of almost 80 mole % of units of the formula:

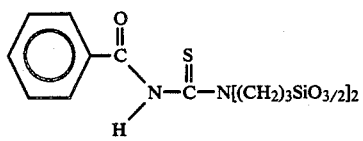

and of approximately 20 mole % of units of the formula:

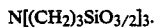

EXAMPLE 11

100 g of a mixture consisting of 60 mole % of a silane containing acyl thiourea groups and of the formula:

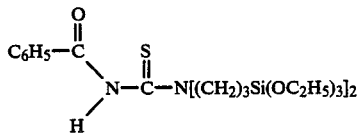

30 mole % of a secondary amino silane of the formula:

and of 10 mole % of $Si(OC_2H_5)_4$ were reacted in an analogous manner with Example 10 and worked up for recovery. 54.8 g orange-colored product were obtained with a sulfur content of 5.40%.

Thus, the polymeric solid approximately exhibited the composition:

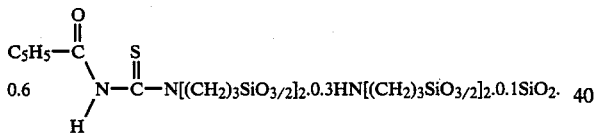

EXAMPLE 12

100 mg of the organopolysiloxane containing acyl thiourea groups and prepared according to example 3 were reacted in a glass beaker with a solution of 10 ml 0.1 n $HNO_3$ in which a total of 10 mg silver were dissolved. The solid matter was agitated a total of 3 hours in the solution, then filtered off and washed with 2×5 ml $H_2O$.

An analysis of the filtrate combined with the washing solution showed no further silver content, so that the amount originally present had been completely adsorbed by the polysiloxane.

EXAMPLE 13

The complexing capacity of the organopolysiloxanes containing acyl thiourea groups is also not influenced by a very high portion of impurity ions.

500 mg of the organopolysiloxane containing benzoyl thiourea groups and prepared according to example 1 were contacted with 20 ml 0.1 n hydrochloric acid. The suspension was transferred after a complete moistening of the solid matter into a small glass column with an inner diameter of 5 mm. The glass column was subsequently loaded within 30 min. with 10 ml of a 0.1 n HCl solution at first in which a total of 100 g palladium and 5 mg cobalt were contained. Then, 10 ml of a 0.1 n HCl solution containing 100 g palladium and 2 mg nickel were again loaded within 30 min. via the column. After the column had been washed with 20 ml 0.1 n-HCl solution, the combined washing and eluate solution was tested for its noble metal and base metal content. According to this test, palladium had been completely bound to the stationary phase while cobalt and nickel were quantitatively in the liquid phase.

EXAMPLE 14

100 mg of the organopolysiloxane containing acyl thiourea groups and prepared according to example 3 were reacted in a glass beaker with 10 ml 0.1 n HCl solution in which a total of 1 mg ruthenium was dissolved. The solid matter was agitated a total of 3 hours at 75° C. in the solution. After filtering off and washing the solid matter remaining on the filter with 2×5 ml $H_2O$, an analytical test of the combined solutions showed that 90% of the ruthenium originally present in the solution had been adsorbed by the solid matter.

EXAMPLE 15

The particularly good adsorption of noble metals can also be utilized for the separation of small portions of palladium or platinum from solutions containing uranium.

Under this aspect of the invention, 500 mg of the adsorbent synthesized in example 9 was loaded in an analogous manner according to Example 13 with 10 ml of a 0.1 n hydrochloric acid solution at a time, each containing 5 mg uranium, 500 μg palladium
5 mg uranium, 80 μg palladium
5 mg uranium, 125 μg platinum
12.5 mg uranium, 125 μg platinum.

An analysis of each eluate showed a complete adsorption of the noble metals, while 100% of the uranium remained in the eluate.

EXAMPLE 16

50 mg of an adsorbent prepared analogously in accordance with Example 9 but in acetone was shaken in a shaking apparatus for 2 hours with 5 ml of a 0.01 molar $HNO_3$ solution which contained 50 μg mercury. A subsequent analysis showed a complete adsorption of the previously dissolved mercury.

EXAMPLE 17

In a glass beaker, there was agitated 3 g at a time of the adsorbent prepared in example 10 at 60° C. for one hour in 50 ml of a hydrochloric solution (1 n) in each of which 50 mg rhodium, 50 mg iridium and 50 mg gold, respectively, were contained. After this time, the residual amount of noble metal originally present was determined in each of the 3 solutions separated from the solid matter. This amount was determined to be rhodium: 2%,
iridium: 2%,
gold: <5%.

EXAMPLE 18

A repetition of the experiment described in example 17 using a hydrochloric ethanolic solution of the metals cited yielded practically the same results.

Thus, it will be apparent that Examples 12 to 18 illustrate the embodiment of the invention wherein a novel organopolysiloxane product as described is used for the separation and removal of heavy metals, including noble metals, from liquid media. In general, the organopolysiloxane is treated with a dilute mineral acid such as hydrochloric or nitric acid and then is contacted with a solution of the heavy metal. Alternatively, the process can be carried out in a single step where the metal is dissolved in an mineral acid solution. The examples also show that when dealing with a mixture of noble metal and a non-noble metal, the polymer of the invention can be used to bind the noble metal thereby recovering the noble metal from solution.

Further variations and modifications of the foregoing will be apparent to those skilled in the art and are intended to be encompassed by the claims appended hereto.

We claim:

1. An organopolysiloxane containing acyl thiourea groups and composed of recurring units of the formula:

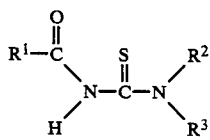
(1)

whereby $R^1$ represents a phenyl group, or a phenyl group substituted with an $NO_2$ group, or an alkyl group with 1 to 3 C atoms, $R^2$ and $R^3$ represent units of formula (2):

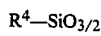
(2)

in which $R^4$ represents an alkylene group with 1 to 10 C atoms or a cycloalkylene group with 5 to 8 C atoms or represents a unit of the formulae:

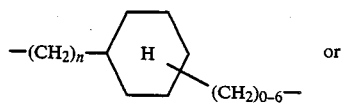

or

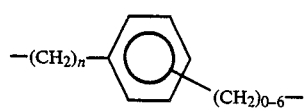

wherein n is from 1 to 6 and the free valences of the oxygen atoms in formula (2) are saturated by (a) silicon atoms of further groups of formula (2) or by (b) silicon atoms of amine units according to formula (3), or mixtures of (a) and (b):

(3)

in which $R^2$ and $R^3$ have the same meaning as in formula (2) and can be the same or different, $R^5$ represents H or has the same meaning as $R^2$ or $R^3$, or by (c) cross-linking binding links

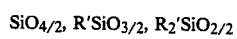

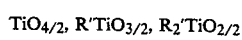

$AlO_{3/2}$, $R'AlO_{2/2}$, or mixtures of (a), (b) and (c) wherein R' represents a methyl or ethyl group and the ratio of the silicon atoms in formulae (1) and (3) to the binding links silicon, titanium, aluminum is 1:0 to 1:10.

2. The organopolysiloxane containing acyl thiourea groups according to claim 1, wherein $R^4$ is a linear or branched chain alkylene group.

3. The organopolysiloxane containing acyl thiourea groups according to claim 1, wherein $R^2$ is the same as $R^3$.

4. The organopolysiloxane containing acyl thiourea groups according to claim 1, wherein formula (1) represents:

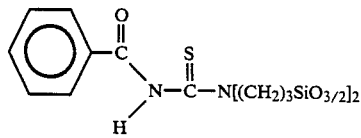

units.

5. The organopolysiloxane containing acyl thiourea groups according to claim 1, wherein the molar ratio between units of formula (1) to units of formula (3) is from 1:0 to 1:9.

6. The organopolysiloxane containing acyl thiourea groups according to claim 1, in the form of a finely divided solid.

7. The organopolysiloxane containing acyl thiourea groups according to claim 1 which has a specific surface area of less than 1 m²/g to 100 m²/g.

8. The organopolysiloxane containing acyl thiourea groups according to claim 1 having a particle size for about 0.1 μm to about 1 cm.

* * * * *